United States Patent
Navarro

(10) Patent No.: US 9,127,641 B2
(45) Date of Patent: Sep. 8, 2015

(54) SEA ELECTRICITY ENERGY PRODUCTION DEVICE TO PRODUCE RENEWABLE ELECTRICITY

(71) Applicant: CREATIVE MINDS SOLUTIONS, LLC, Honolulu, HI (US)

(72) Inventor: Richard Navarro, Honolulu, HI (US)

(73) Assignee: Creative Minds Solutions LLC, Grapevine, TX (US)

( * ) Notice: Subject to any disclaimer, the term of this patent is extended or adjusted under 35 U.S.C. 154(b) by 98 days.

(21) Appl. No.: 13/960,524

(22) Filed: Aug. 6, 2013

(65) Prior Publication Data

US 2014/0042750 A1 Feb. 13, 2014

Related U.S. Application Data

(60) Provisional application No. 61/680,573, filed on Aug. 7, 2012.

(51) Int. Cl.
*F03B 13/14* (2006.01)
(52) U.S. Cl.
CPC ............... *F03B 13/145* (2013.01); *Y02E 10/38* (2013.01)

(58) Field of Classification Search
CPC .......... Y02E 10/38; Y02E 10/28; Y02D 10/22
USPC .............................................................. 290/53
See application file for complete search history.

(56) References Cited

U.S. PATENT DOCUMENTS

| | | | |
|---|---|---|---|
| 6,451,204 B1* | 9/2002 | Anderson | 210/162 |
| 8,127,542 B1* | 3/2012 | Dolcimascolo | 60/398 |
| 2005/0013691 A1* | 1/2005 | Enomoto et al. | 416/182 |
| 2007/0258771 A1* | 11/2007 | Weldon | 405/76 |
| 2009/0212572 A1* | 8/2009 | Sundermann | 290/54 |
| 2010/0158705 A1* | 6/2010 | Guinard | 417/53 |
| 2012/0251349 A1* | 10/2012 | Ortiz | 417/330 |

* cited by examiner

*Primary Examiner* — Tulsidas C Patel
*Assistant Examiner* — Sean Gugger
(74) *Attorney, Agent, or Firm* — Leighton K. Chong

(57) ABSTRACT

A sea electricity energy production device has a submerged water gate for controlling a flow of sea water into the device, one or more paddle wheels that receive water flow through the water gate to drive main gears in rotary motion, a series of pressure tanks having pistons driven by the main gears driven by the paddle wheels to pressurize water flow from the pressure tanks, and a Francis reaction turbine built on land that receives the pressurized water flow from the pressure tanks to drive the turbine and generate electricity.

7 Claims, 2 Drawing Sheets

SEA ELECTRICITY ENERGY PRODUCTION DEVICE TO PRODUCE RENEWABLE ELECTRICITY

This U.S. patent application claims the priority filing date of U.S. Provisional Application 61/680,573 filed on Aug. 7, 2012, of the same inventor in the present application, and which is incorporated by reference herein. This U.S. patent application is also related to U.S. patent application Ser. No. 12/690,885 filed on Jan. 20, 2010, entitled "Sea Electricity Energy Production Unit", which issued on Apr. 23, 2013 as U.S. Pat. No. 8,424,300, and which is incorporated by reference herein.

BACKGROUND OF INVENTION

Approximately 68% of the Earth's population does not have access to electricity so there is a world wide need to create low cost non-polluting electricity. There are nine issues limiting more renewable energy (RE) usage:

Location: RE devices must be close to population centers for maximum cost effectiveness but may require a large amount of land which may not be available near population centers. RE devices may not be welcome near population centers for aesthetic, cultural, or health risk concerns.

24 Hour Availability: RE production is often limited by the time of day which may not coincide with electricity demand or may require expensive storage until the energy is needed.

Firm Electricity: Most RE devices are intermittent as they depend on uncontrollable factors so "firm" sources of energy (fossil fuels) are needed to support RE production. This could significantly increase the cost effectiveness and applicability of RE production.

Cost: Traditional fuel costs are rising and unpredictable in a geo-political world. They also contribute to environmental pollution or present health risks as found during the Chernobyl and Japan nuclear problems. 50% or more of the cost of traditional electricity is due to fuel costs which are unpredictable and expected to rise. While many forms of RE production have zero fuel costs, cost efficiency may be reduced by land acquisition, cost of converting the fuel to electricity, storage during peak production times which may not coincide with peak demand, transporting, and the need for back up firm sources. Conventional hydro-electric production is cost efficient but is limited by geotopic factors such as the need for a stream or dam, seasonal variations in precipitation and run-off, or the destruction of habitat, cultural, and archeological artifacts and may adversely impact on fish or wildlife.

Environmental and Cultural Concerns: Geothermal is limited by cultural concerns and potential risks of hydrogen sulfide and water contamination. Wind requires large amounts of space, may be considered eyesores, noisy, and may harm birds. Biomass and biofuels may produce harmful emissions or harm the environment in other ways.

Reliability: Many forms of RE production are not available 24/7, during peak demand periods, or may cause unpredictable fluctuations in the normal 60 Hertz requirement.

Storage: Fluctuations in production and lack of production during peak consumption periods requires increased storage and special devices to control ramping. This increases costs and reduces applicability of RE.

Curtailment: Because RE sources have not been controllable they are more challenging to operate efficiently and profitably. RE production has not been temporally synchronized with consumption.

Land Usage: RE production may require lots of land and be met with a "not in my backyard" consumer attitude.

While previous RE sources face these nine issues that restrict their widespread usage, the present invention is designed to address all of these issues in a cost effective way that draws on proven technology for increased reliability and controllability.

SUMMARY OF INVENTION

In accordance with the present invention, a sea electricity energy production device employs a flow of sea water through a submerged water gate and across paddle wheels to create a pressurized water flow that drives a land-based Francis reaction turbine to generate electricity. The water gate has walls and a floor that guide a controlled flow of water into the device and separates incoming from outgoing water.

In a preferred embodiment, a silt trap contains silt and debris entering the water gate, and helps control unusual or excessive water flow. A water abutment wall guides water to the silt trap, supports a marine filter, establishes a boundary to separate incoming water from a holding area, and facilitates the flow of water through the marine filter. The marine filter restricts the flow of marine life into the device and helps filter sea borne debris from the device. The paddle wheels drive the main gears to rotate crankshafts that drive the pistons of the pressure tanks and flush tank. A holding tank stores and controls the flow of water to the pressure tanks. An overflow system vents excessive water flow from the holding tank during unusual flow periods.

A second water abutment wall located further inland forms another wall of the holding tank. It provides the orifice and gating to the pressure tanks. A series of one-way valves control the flow of water and allow it to move only from the holding tank to the pressure tanks. A series of pressure tanks pressurize the water for a constant flow to the turbine. An even number of tanks is used to allow half of the tanks to be filling with water while the other half is delivering water to penstocks. Pressure pistons (one for each pressure tank) pressurize the water on the downstroke and create a negative pressure in the tank on the upstroke to increase the rate of filling of the pressure tanks.

One-way valves control the flow of water from the pressure tanks to the penstocks so water flows only from the pressure tank to the penstock. It works out of phase with the entrance one-way valve. The penstocks convey the water from the pressure tanks vertically to the reaction turbine. Horizontal penstocks deliver the water from the vertical penstock to the reaction turbine. The Francis reaction turbine converts the flow of water from the penstock to a rotary movement to produce electricity.

The water return penstocks start at the exit point of the reaction turbine and deliver the water to the silt trap and flush tank to return the water to the sea. The exit one-way valves located at the termination of the water return penstocks prevent water from the silt trap or flush tank from entering the water return penstock. The flush tank accepts the overflow water from the sea gate, silt trap, and water exit penstock to return the spent water to the sea. Under some circumstances, it may be necessary to pressurize this water to force it back to the sea. This can be done either with optional valving and penstocks from the pressure tanks or another series of pressure tanks driven by the main gears and a set of auxiliary gearing. The flush tank bed serves as the lowest boundary of the flush tank to control the water flow back to the sea.

A gearing system for the device has main gears strategically placed along the paddle wheel shaft to drive the crankshaft gears to operate and control the pressure pistons in the pressure tank. These gears may also be a source of power to the flush tank. The crankshaft gears control the rate of rotation of the crankshaft. The crankshaft converts the rotary motion of the crankshaft gears to a vertical motion to pressurize the pressure tanks and/or flush tanks (if needed to force the water back to the sea). An auxiliary gear system may be needed for local conditions to power an additional series of pressure tanks to return the exiting water to the sea. This is an optional item depending on local conditions.

Depending on local conditions, auxiliary crankshafts may be required to effect return of the water from the flush tank to the sea. A control area serves as operational, monitoring, and control center for the entire device, and provides monitoring of all systems twenty-four hours a day seven days a week.

Other objects, features, and advantages of the present invention will be explained in the following detailed description of the invention having reference to the appended drawings.

DETAILED DESCRIPTION OF PREFERRED EMBODIMENT

In the following detailed description, a preferred embodiment of the invention is illustrated providing certain specific details of its implementation. However, it will be recognized by one skilled in the art that many other variations and modifications may be made given the disclosed principles of the invention.

In the preferred embodiment, a sea electricity energy production (SEEP) device employs a flow of sea water as a power source to drive a Francis reaction turbine to generate electricity. Francis reaction turbines are well-known in the field of the invention, and a detailed explanation thereof is provided in U.S. Pat. No. 8,424,300, which is incorporated by reference herein.

Figure 1:
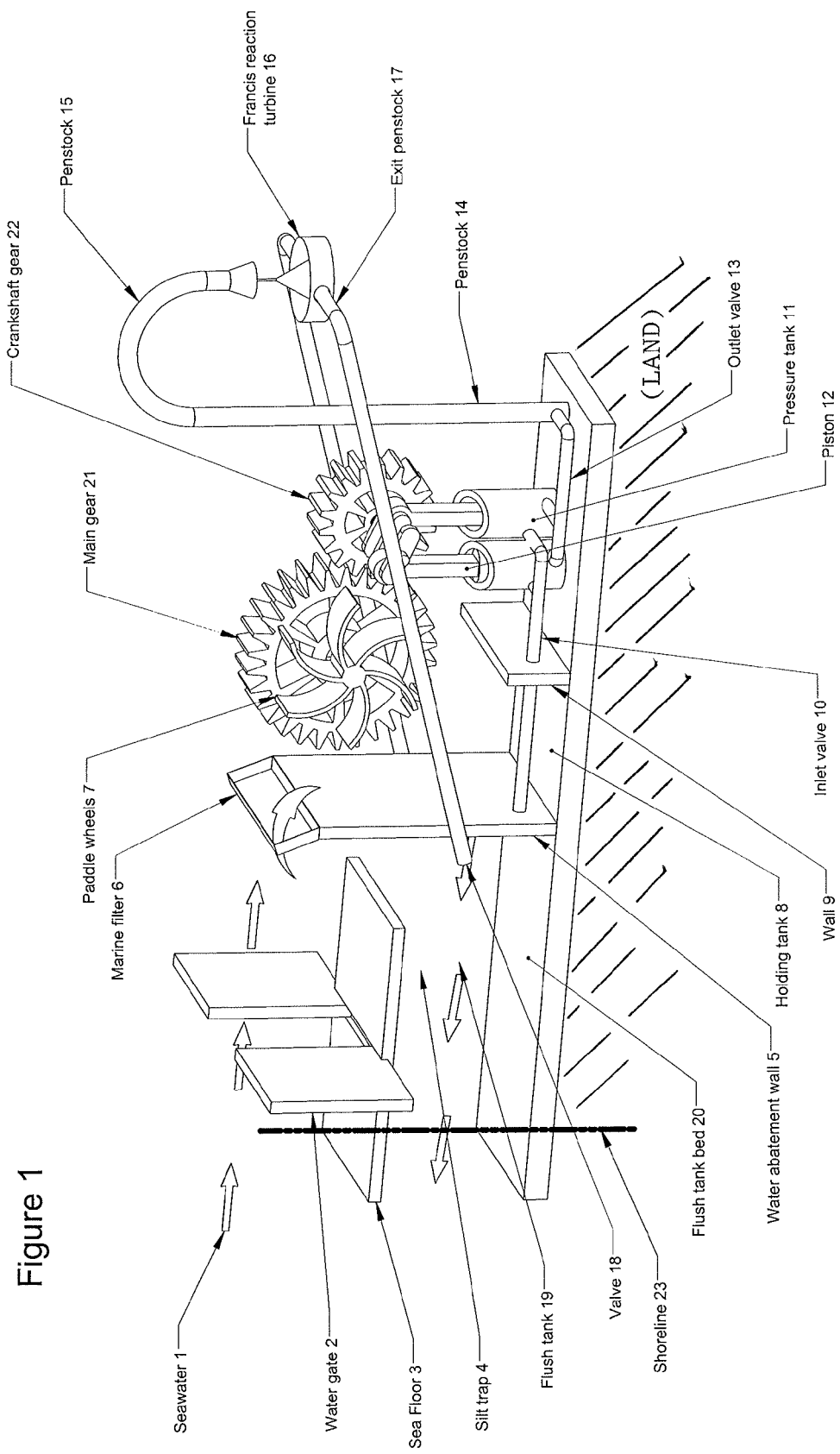
FIG. 1 is a schematic view of a sea electricity energy production device that employs wave surges of sea water to drive a land-based Francis-reaction turbine to generate electricity.

Referring to FIG. 1, a flow of sea water 1 (flow direction indicated by the arrow in the figure) enters through the water gate 2, passes over the sea gate floor 3 and goes down through the silt trap 4 or up to the marine filter 6. The sea gate floor 3 opens to the silt trap 4 below and separates the incoming water from the outgoing water in the flush tank 19. The sea water 1 strikes the water abutment wall 5 which forces the water up to marine filter or down to the silt trap. This wall 5 also supports the marine filter 6.

Water that passes through the marine filter falls downward into the holding tank 8 via gravity and turns the paddle wheels 7 in the process. The holding tank 8 is formed by the water abutment walls 5, 9, and other walls not shown in the diagram. As the paddle wheels turn, they rotate the main gears 21 and the crankshaft gears 22 to turn the crankshaft 23. This converts the rotary motion to a vertical motion to alternatively raise and lower the pistons 12 in the pressure tanks 11. Raising of the pistons creates a negative pressure in the pressure tanks to facilitate the filling of the pressure tanks while lowering the pistons creates a positive pressure in the pressure tanks to force the water to the penstocks 14 & 15 that deliver the water to the Francis reaction turbines 16. The intake of water to the pressure tank is controlled by a one-way valve 10 while the outflow of water to the penstocks is controlled by a one-way valve 13. These valves work out of phase with each other such that when one is open, the other is closed. The turbine blades are rotated by the incoming water which turns the generator in the turbine to produce electricity. The water exits the turbine at the exit penstocks 17 where it is routed back to the silt trap 4 to flush silt and debris into the flush tank. Water from the silt trap and flush tank are prevented from entering the exit penstocks by a one-way valve 18. The flush tank and silt trap are partially formed by the flush tank bed 20, sea gate floor, and other walls not shown in the diagram. Water from the flush tank is returned to the sea.

The SEEP device operates as an on-shore hydro-electric power plant which uses the sea as a storage reservoir to drive one or more Francis reaction turbines. Sea water 1 serves as the reservoir to provide power to the device. When the sea gates 2 are opened, the sea water 1 flows via gravity into the device where it strikes a concrete water abutment wall 5. This wall runs vertically from the flush tank bed 19 to the marine filter 6 and is below the surface of the sea such that the entering water will flow over the wall 5 through the marine filter 6 before striking and rotating the paddle wheels 7. Some of the water seaward of the concrete wall will flow downward to the entrance of the flush tank which serves as a silt/debris trap 4. Heavier silt and debris may become lodged in the flush tank 18 and will be flushed out during the continued operation by water from the exiting penstocks 17 to be returned to the sea.

Water which has served to rotate the paddle wheels 7 will drop via gravity into the holding tanks 8 where it will enter the pressure tanks 11 through the one-way-valves 10. The rotation of the paddle wheels will rotate a shaft connected to a series of main gears 20 thereby converting the mechanical energy of the flowing water to the rotation of the main gears.

Figure 2:
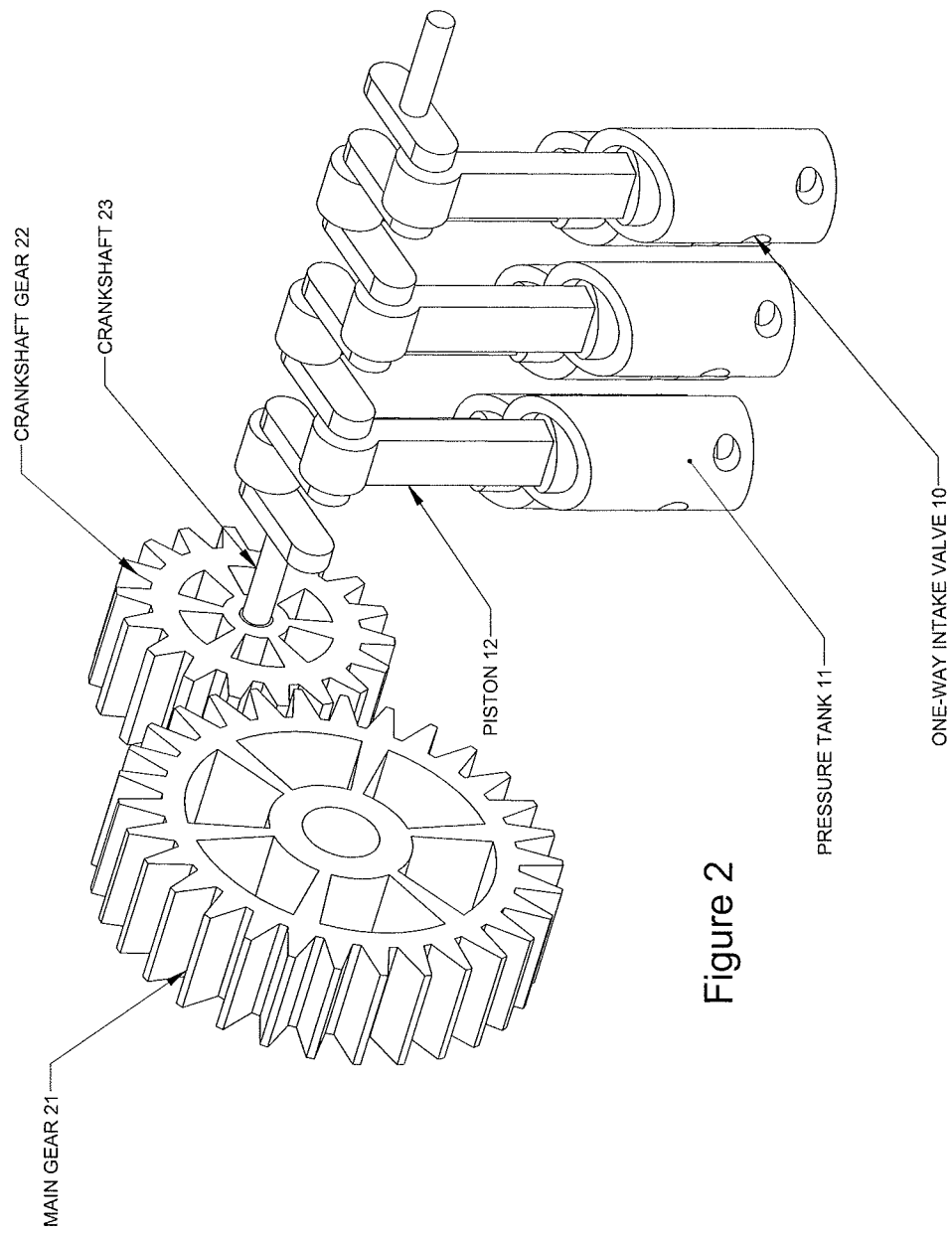
FIG. 2 is a schematic view of a gearing system for the sea electricity energy production device.

Referring to FIG. 2, the main gears 21 will be abutted to the crankshaft gears 22 to induce rotation of the crankshaft 23. Rotation of the crankshaft will induce vertical movement of the piston shafts connected to the piston heads located in the top of a series of pressure tanks. The rotation of the crankshaft will result in half of the piston heads being moved upwards thereby drawing water into the tanks while half of the tanks will be moved downward thereby creating pressure on the water in the tanks. As the piston head 12 is drawn upwards, the one-way-entrance valve 10 to the pressure tank opens and a negative pressure is induced in the pressure tank to facilitate sea water 1 ingress that has already begun to enter the pressure tanks via gravity.

Once the pressure tank is filled or the piston has reached top-dead-center of rotation of the crankshaft, the process is reversed as the crankshaft rotates thereby causing the piston head to begin applying pressure to the water in the pressure tank 11. With the initiation of the downward stroke, the entrance-one-way valve 10 closes to prevent water from returning to the holding tank while simultaneously the exit-one-way valve 13 opens thereby allowing water to void the pressure tank into the turbine penstocks 14 and 15. The pressurized water passes upwards through the penstocks to be delivered to the blades of the turbine thereby inducing rotation of the turbine to produce electricity. The electricity is shunted to the appropriate power transformers located on land near the power grid connection.

There are 9 main areas where the device is to be monitored and controlled to sustain efficient operation, such as by computers monitored 24/7 by a trained technician:

1) The flow of water into the device must be controlled or stopped by the sea gates. This will allow for operation and curtailment of the device as well as for maintenance, repair, or emergency shut off in the case of an unusual sea event such as a tsunami, earthquake, abnormal waves or security threats.

2) The marine filter will need maintenance and cleaning from time to time based on local conditions.

3) Water volume and heights must be constantly monitored for all intakes, storage, pressure and flush tanks.

4) The mechanical energy and speed of rotation of the paddle wheels will need to be controlled and routed to the proper components in a timely fashion for maximum efficiency.

5) In particular, the pistons in the pressure tanks must be synchronized to allow a steady flow of water to the turbines. It is expected that there will be multiple pressure tanks such that some of the pressure tanks will be filling with water while others will be emptying into the penstocks.

6) The water flowing into the pressure tanks must be gated so that the entrance one-way valve is closed during the pressurization phase and open during the filling stage.

7) The pressurization of the water in the penstocks must be monitored and adjusted as necessary to insure maximum efficiency of the turbine.

8) The design assumes that the reaction turbine selected will operate with a low head flow and that flow will be enhanced and controlled by the pressurization of the water within the pressure tanks as it flows through the penstocks to the turbine.

9) The water exiting the turbines must be monitored and controlled to insure proper voiding from the turbine into the exit penstocks. Auxiliary and emergency controls and valves must be in place, operational, and monitored to prevent malfunctions.

The infra-structure of the SEEP device may be constructed on site from reinforced concrete and non-corrosive plastics for maximum durability and sustainability in highly corrosive sea water. The actual design of a given plant will be based on local conditions. Some components (e.g., paddle wheels, pressure tanks, pistons and piston shafts, bearings, crankshafts, all gears, reaction turbines, etc.) of the SEEP device may be factory built or modularized. Modularization of the pressure tanks will improve reliability and durability if they are built under controlled conditions.

All described elements of the device are necessary except as noted. There may be variations in the construction of a given SEEP plant based on local conditions of the land and sea; however, the basic design should not be changed significantly from plant to plant.

It may be necessary to include a pressure system for the exiting water if the underwater pressure is too high to allow the water to return to the sea via gravity. This should not be needed; however as the pressure created by the water exiting the turbine should be sufficiently high to overcome the underwater pressure at the exit point. An unknown variable that will fluctuate from site to site is the presence of underwater currents near the exit points. If there is sufficient current flowing toward the water exit point, it may be necessary to lift the water to a higher level where the pressure is less or re-direct the water flow from the flush tank to be complimentary to the incoming current. Several possible solutions are available to deal with this possibility. For example, one solution might entail the routing of pressurized water from one or more pressure tanks 11 to the exit penstocks 17 to help overcome the underwater pressure at the termination of the flush tank. Alternatively at higher cost, it may be necessary to install a series of seaward (auxiliary 24) gears driven by the main gears 21 and create another series of pressurized tanks to provide power for the flushing operation.

Another possible permutation of the SEEP device would be to reconfigure the flow of the spent water exiting the turbine to a desalination plant thereby creating fresh water. Such a design is being considered for subsequent embodiments.

The SEEP device provides pollution free renewable electricity using the proven technology of a Francis reaction turbine. It addresses all nine of the issues plaguing RE sources and avoids the environmental and costs problems associated with other electrical production systems.

Location: The SEEP device can be built close to population centers near a sea or lake shore as it does not require a large tract of land. This reduces the cost of energy transmission, land acquisition, construction and maintenance. It also reduces environmental concerns as there is no pollution to land, sea, or air.

24 Hour Availability: The SEEP device is fully controllable. The sea reservoir is a constant and the design of a specific location can control for tidal fluctuations. The sea gates control the flow of water into the device so energy production can be paired with energy consumption needs.

Firm Electricity: The presence of a constant source of fuel (i.e., the sea) allows the SEEP device to eliminate the problem of intermittency which plagues other RE devices. This will drastically reduce the cost of construction and allow operation as a "firm" source of energy as back-up storage or auxiliary devices will not be needed. The SEEP device is designed to operate with multiple pressure tanks and multiple reaction turbines so one or more may be taken out of operation for maintenance without totally shutting down the power source. Modularization of the SEEP device will reduce down time for repair and maintenance.

Cost: The SEEP device is built on land rather than on the sea for reduced construction, maintenance, and grid connection costs. The fact that it requires relatively little land also reduces development costs, reduces environmental and aesthetic concerns, and allows the device to be built closer to population centers where the electricity is consumed. Fuel costs are non-existent for the SEEP device. There are no significant sources of environmental pollution or health risks and protections are provided for marine life. The proven technology and flexibility of a Francis reaction turbine, the absence of long underwater transmission lines, and the controllability of power production reduces the cost of producing electricity using the sea and enhances reliability. The flexibility of ramping up the SEEP device through controlled gating of water reduces the need for storing electricity or requiring a "firm" source. The limitations of traditional hydro-electric plants are eliminated because the sea is a constant source of water, covers 70% of the Earth, and is relatively unaffected by evaporation and precipitation.

Environmental and Cultural Concerns: The SEEP device does not pollute the environment so it avoids the potential problems of geothermal and all of the environmental issues of fossil and nuclear fuels. It uses sea water as the fuel and returns the sea water safely to the sea. The debris trap may be configured to collect and recycle sea borne trash. The SEEP device requires relatively little land so it can be built in areas where land is a premium such on an island or near population centers. The absence of environmental pollution reduces the potential negative concerns associated with other electric plants.

Reliability: The control provided by the gating of water into the device allows total operational control for maximized reliability and the elimination of a backup generator. The flow of water can be controlled to meet anticipated energy needs. The gating and pressurization of the water allows a constant 60 Hertz frequency to reduce grid concerns and avoid spikes which can damage electrical devices.

Storage: The control provided by gating of a constant reservoir of water eliminates the need for expensive batteries or the creation of storage reservoirs.

Curtailment: The control provided by gating of the water and operation of the pressure tanks allows flexible operation to meet anticipated energy needs during peak consumption and reduction of production during non-peak hours.

Land Usage: The SEEP device requires relatively little land so acquisition and operational costs are minimized. The small land footprint will help to reduce potential consumer antagonism.

An evolutionary version of the SEEP device may deliver the water to a desalination plant to produce fresh water and recycle sea borne trash.

It is to be understood that many modifications and variations may be devised given the above description of the general principles of the invention. It is intended that all such modifications and variations be considered as within the spirit and scope of this invention, as defined in the following claims.

The invention claimed is:

1. A sea electricity energy production device, which is located primarily onshore on land facing wave action from the sea in proximity thereto, for driving a Francis reaction turbine to generate electricity, comprising:
   a submerged water gate for controlling an incoming flow of sea water into a flush tank of the device, the flush tank having an abutment wall at a distal side thereof against which the incoming flow of sea water surges against and over a top portion thereof;
   one or more paddle wheels positioned above a holding tank on a distal side of the abutment wall that receive the water flow through the water gate and surging over the top portion of the abutment wall and falling by gravity to rotate the paddle wheels, the rotation of the paddle wheels being coupled to a crankshaft axle to drive main gears for the crankshaft in rotary motion;
   a series of pressure tanks having pistons driven by the main gears for the crankshaft driven by the paddle wheels to pressurize water flow from the holding tank into the pressure tanks, the pressure tanks having an output flow of water pressurized by the pistons for feeding into penstocks; and
   the penstocks feeding the pressurized water flow to a Francis reaction turbine built on land that receives the pressurized water flow from the pressure tanks to drive the turbine and generate electricity.

2. A sea electricity energy production device according to claim 1, further comprising a silt trap that contains silt and debris entering the water gate, and helps control unusual or excessive sea water flow.

3. A sea electricity energy production device according to claim 2, wherein the water abutment wall guides sea water flow to the silt trap, and supports a marine filter that restricts the flow of marine life into the device.

4. A sea electricity energy production device according to claim 1, further comprising one-way valves that control the water flow from the pressure tanks to the penstocks that convey the water flow from the pressure tanks to the Francis reaction turbine.

5. A sea electricity energy production device according to claim 2, wherein a water return penstock is provided at an exit point from the Francis reaction turbine to return the water to the sea.

6. A sea electricity energy production device according to claim 5, wherein exit one-way valves are located at the termination of the water return penstock to prevent water from the silt trap from entering the water return penstock.

7. A sea electricity energy production device according to claim 5, wherein the flush tank accepts overflow water from the water gate, silt trap, and/or water return penstock and returns the overflow water to the sea.

* * * * *